United States Patent
Krishnamoorthy

(10) Patent No.: US 10,678,521 B1
(45) Date of Patent: Jun. 9, 2020

(54) SYSTEM FOR IMAGE SEGMENTATION, TRANSFORMATION AND USER INTERFACE COMPONENT CONSTRUCTION

(71) Applicant: Bank of America Corporation, Charlotte, NC (US)

(72) Inventor: Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/210,820

(22) Filed: Dec. 5, 2018

(51) Int. Cl.
*G06F 8/38* (2018.01)
*G06T 7/10* (2017.01)
*G06N 3/04* (2006.01)

(52) U.S. Cl.
CPC ............. *G06F 8/38* (2013.01); *G06N 3/0454* (2013.01); *G06T 7/10* (2017.01)

(58) Field of Classification Search
CPC .................................................. G06F 3/04847
See application file for complete search history.

(56) References Cited

U.S. PATENT DOCUMENTS

| | | |
|---|---|---|
| 5,832,474 A | 11/1998 | Lopresti et al. |
| 5,877,743 A | 3/1999 | Dzik |
| 6,233,351 B1 | 5/2001 | Feeney et al. |
| 6,301,586 B1 | 10/2001 | Yang et al. |
| 6,310,623 B1 | 10/2001 | Zhang |
| 7,609,278 B1 | 10/2009 | Dash |
| 7,793,217 B1 | 9/2010 | Kim et al. |
| 8,239,882 B2 | 8/2012 | Dhanjal et al. |
| 8,407,611 B2 | 3/2013 | Zhang et al. |
| 8,438,495 B1 | 5/2013 | Gilra et al. |
| 8,522,201 B2 | 8/2013 | Elmieh et al. |
| 8,718,375 B2 | 5/2014 | Ouyang et al. |
| 9,064,147 B2 | 6/2015 | Ouyang et al. |
| 9,489,572 B2 | 11/2016 | Mlinand et al. |
| 9,528,847 B2 | 12/2016 | Albrecht |
| 9,600,918 B2 | 3/2017 | Wiemker et al. |
| 10,127,689 B2 | 11/2018 | Chen et al. |
| 10,521,781 B1 * | 12/2019 | Singfield ............ G06K 9/00335 |
| 2002/0073121 A1 | 6/2002 | Sano et al. |
| 2004/0028274 A1 | 2/2004 | Kawakami et al. |
| 2006/0062463 A1 | 3/2006 | Li et al. |
| 2007/0133848 A1 | 6/2007 | McNutt et al. |
| 2008/0013860 A1 | 1/2008 | Blanco |
| 2008/0313553 A1 | 12/2008 | Srivastava |

(Continued)

*Primary Examiner* — Cao H Nguyen
(74) *Attorney, Agent, or Firm* — Michael A. Springs; Moore & Van Allen PLLC; Vaidehi Bachoti

(57) ABSTRACT

Embodiments of the invention are directed to systems, methods, and computer program products for user interface construction based on image segmentation, transformation of user interface image segments, and construction of user interface objects. The system is configured to capture a static image of a visual representation of an user interface (UI), wherein the static UI image comprises a visual representation of one or more UI image components of the UI. The system is further configured to segment the static UI image into one or more UI image segments, wherein each UI image segment is associated with a UI image component of the one or more UI image components, and construct an operational user interface by embedding the constructed first UI component object into the operational user interface.

20 Claims, 7 Drawing Sheets

(56) References Cited

U.S. PATENT DOCUMENTS

| | | |
|---|---|---|
| 2009/0089689 A1 | 4/2009 | Clark et al. |
| 2009/0279756 A1 | 11/2009 | Gindele et al. |
| 2009/0310835 A1 | 12/2009 | Kaus et al. |
| 2011/0010645 A1 | 1/2011 | Mihalcea |
| 2011/0064289 A1 | 3/2011 | Bi et al. |
| 2012/0035463 A1 | 2/2012 | Pekar et al. |
| 2012/0182286 A1 | 7/2012 | Wang |
| 2012/0200560 A1 | 8/2012 | Masumoto |
| 2012/0254431 A1* | 10/2012 | Kylau .................. G06F 9/54 709/226 |
| 2013/0135305 A1 | 5/2013 | Bystrov et al. |
| 2013/0339907 A1 | 12/2013 | Mates et al. |
| 2015/0346988 A1* | 12/2015 | Hwang .............. G06F 3/04847 715/771 |
| 2016/0266878 A1 | 9/2016 | Mankovskii |
| 2017/0337045 A1 | 11/2017 | Hills et al. |
| 2018/0174330 A1* | 6/2018 | Chen .................. G06F 11/3664 |
| 2018/0321818 A1 | 11/2018 | Treadway et al. |

* cited by examiner

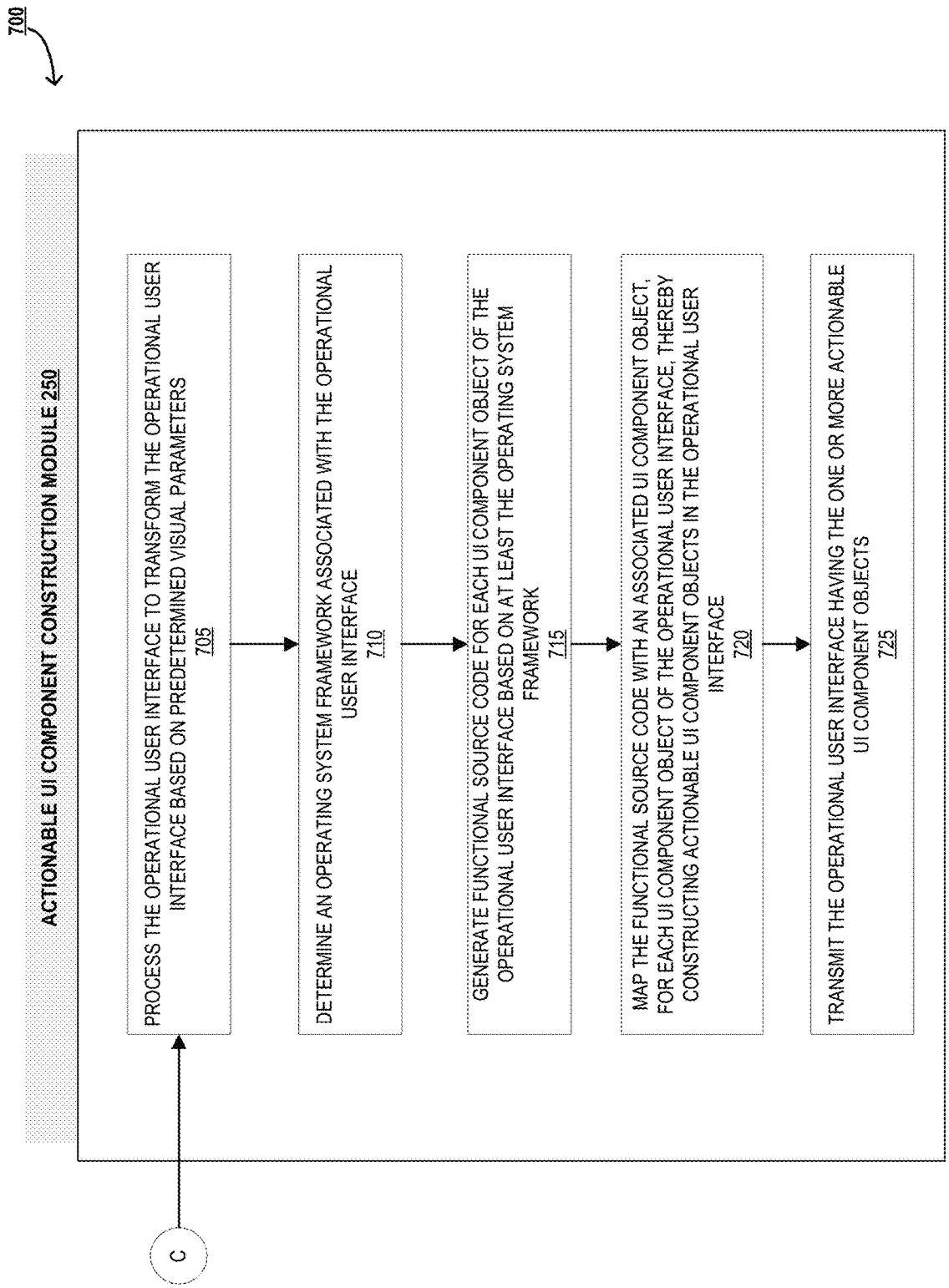

SYSTEM FOR IMAGE SEGMENTATION, TRANSFORMATION AND USER INTERFACE COMPONENT CONSTRUCTION

FIELD OF THE INVENTION

The present invention generally relates to the field of user interface constriction technology. In particular, the novel present invention provides a unique, technology-agnostic platform for user interface construction based on image segmentation, transformation of user interface image segments, and construction of user interface objects. Embodiments of the inventions are configured for fundamentally transforming a static representation of a user interface into functional and actionable user interface components.

BACKGROUND

Increasingly prevalent computers, mobile phones, smart devices, appliances, and other devices, require a variety of user interfaces for facilitating user interaction with applications, operating systems, physical device components such as sensors, cameras etc., communication features and the like of the devices. Typically, these interfaces involve a graphical user interface. However, in conventional systems, creating these user interfaces is typically only possible from a front-end perspective that is end-use technology specific (e.g., specific to the operating system or application platform that the interface is being created for) and requires a dedicated interface creation applications that are specific to the end-use technology. This conventional process, however, is heavily reliant on and specific to the end-use technology and the created user interfaces or intermediary steps involved in the creation are not portable to a different end-use technology. Moreover, this conventional process requires technology specific skills, is time intensive and laborious. Therefore, a need exists for a novel user interface construction system that is technology agnostic, that integrates back-end processing with the front-end interface, and that is not resource and time intensive that addresses the foregoing shortcomings of conventional system.

The previous discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or the foregoing deficiencies of conventional systems, addresses the foregoing identified needs and provides improvements to existing technology by providing an innovative system, method and computer program product for user interface construction based on image segmentation, transformation of user interface image segments, and construction of user interface objects. Typically the system comprises: at least one memory device with computer-readable program code stored thereon; at least one communication device; at least one processing device operatively coupled to the first proctor module application and the second proctor module application, the at least one memory device and the at least one communication device. Executing the computer-readable code is configured to cause the at least one processing device to: capture a static image of a visual representation of an user interface (UI), wherein the static UI image comprises a two-dimensional visual representation of one or more UI image components of the UI; analyze the static image to identify the one or more UI image components in the static UI image based on processing the static UI image, wherein identifying the one or more UI image components further comprises: determining one or more dimensional boundaries associated with the one or more UI image components; segment the static UI image into one or more UI image segments based on at least the one or more dimensional boundaries, wherein each UI image segment is associated with a UI image component of the one or more UI image components; determine, for each of the one or more UI image segments, structural elements comprising a UI image component type, a UI image component spatial location, and a UI image component hierarchy level; construct, for a first UI image segment of the one or more UI image segments, an associated first UI component object; and construct an operational user interface by embedding the constructed first UI component object into the operational user interface based on at least the associated (i) UI image component hierarchy level and (ii) UI image component spatial location.

In some embodiments, or in combination with any of the previous embodiments, the visual representation of the UI comprises a hand drawn image and/or a wireframe associated with the UI.

In some embodiments, or in combination with any of the previous embodiments, the system is further configured to: reshape the one or more UI image segments at the generative network to correct the one or more UI image segments and construct a fully connected UI layer associated with the one or more UI image segments.

In some embodiments, or in combination with any of the previous embodiments, constructing, at the generative network, the first UI component object for the first UI image segment further comprises: extracting predetermined critical features from the first UI image segment, and constructing a functional UI component object that matches the structural elements associated with the first UI image segment and the extracted predetermined critical features.

In some embodiments, or in combination with any of the previous embodiments, the system is further configured to: generate a first convolution associated with the constructed first UI component object; transmit the first convolution to a discriminative network comprising at least a discriminator; perform, via the discriminator, validation of the constructed first UI component object by analyzing the first convolution, wherein validating the constructed first UI component object comprises determining an accuracy of the constructed first UI component object based on analyzing the first convolution with respect to the structural elements associated with the first UI image segment; and transmit, from the discriminative network to the generative network, a signal indicating the successful or unsuccessful validation of the constructed first UI component object.

In some embodiments, or in combination with any of the previous embodiments, the system is further configured to:

in response to a successful validation of the constructed first UI component object by the discriminator, perform an upsampling transformation of the first UI component object, based on at least the associated UI image component hierarchy level to render the UI component object compatible for embedding into a UI interface layer at the associated component hierarchy level; and construct the operational user interface by embedding the transformed first UI component object into the operational user interface, wherein the transformed first UI component object is compatible for embedding into the UI interface layer of the operational user interface at (i) the UI image component hierarchy level and (ii) the UI image component spatial location.

In some embodiments, or in combination with any of the previous embodiments, the system is further configured to: perform the upsampling transformation of the first UI component object in response to determine that the constructed first UI component object is not compatible for embedding into the operational user interface at (i) the UI image component hierarchy level and/or (ii) the UI image component spatial location.

In some embodiments, or in combination with any of the previous embodiments, the system is further configured to: in response to an unsuccessful validation of the constructed first UI component object by the discriminator, determine a residual of the constructed first UI component object at the generative network; and reconstruct for the first UI image segment of the one or more UI image segments, a second UI component object based on the residual.

In some embodiments, or in combination with any of the previous embodiments, the system is further configured to: determine an operating system framework associated with the operational user interface; generate, at a UI encoder, functional source code for each UI component object of the operational user interface based on at least (i) at least one action to be performed by the UI component object, and (ii) the operating system framework and the at least one action; map the functional source code with an associated UI component object, for each UI component object of the operational user interface, thereby constructing actionable UI component objects in the operational user interface; and transmit the operational user interface having the one or more actionable UI component objects.

In some embodiments, or in combination with any of the previous embodiments, the generative network further comprises an attentional generative network comprising: a plurality of attentive component building applications, wherein each of the plurality of attentive component building applications is associated with a UI image component hierarchy level of a plurality of UI image component hierarchy levels of the static image, wherein each of the plurality of attentive component building applications is structured to construct one or more UI component object of the associated UI image component hierarchy level; a plurality of UI component generation applications, wherein each of the plurality of UI component generation applications is structured to transform a UI component object constructed by an associated attentive component building application of the plurality of attentive component building applications; and a plurality of convolution applications, wherein each of the plurality of convolution applications is structured to perform a convolution transformation of a transformed UI component object from an associated UI component generation application of the plurality of UI component generation applications.

In some embodiments, or in combination with any of the previous embodiments, the system is further comprises one or more image segmentation applications structured to segment the static UI image into one or more UI image segments, wherein the one or more image segmentation applications are associated with a Mask Regional Convolutional Neural Network (Mask RCNN).

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
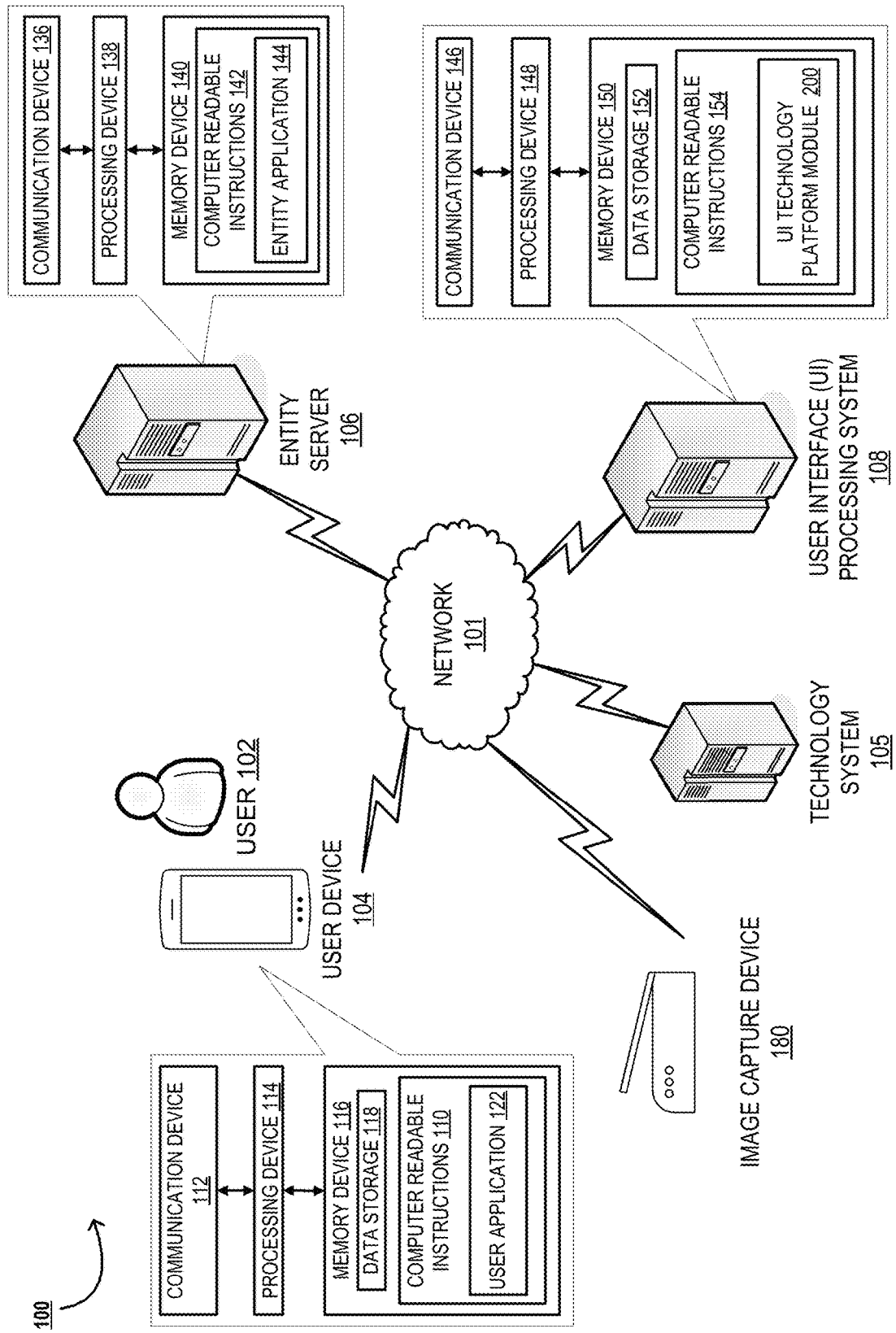
Figure 2:
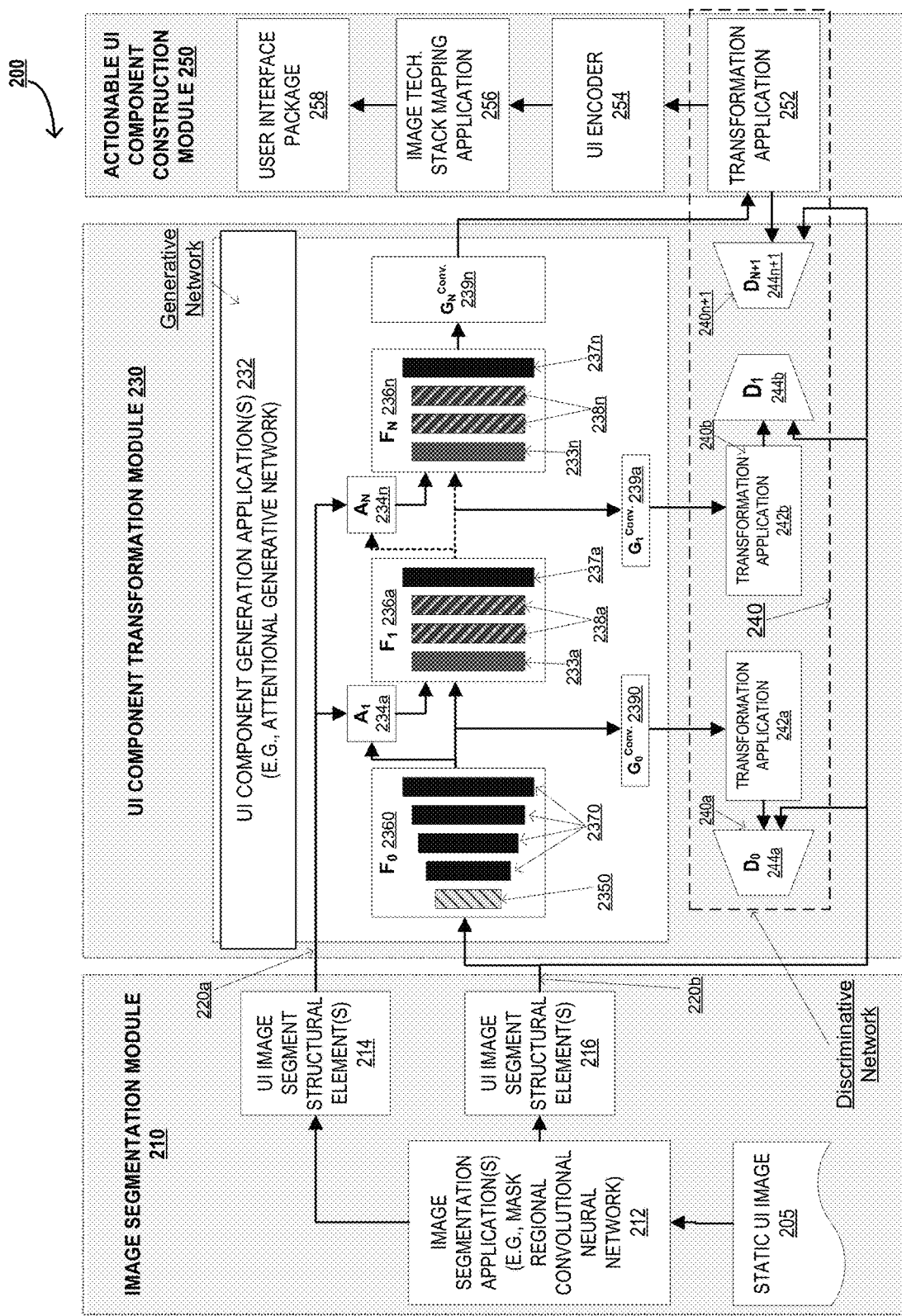
Figure 3:
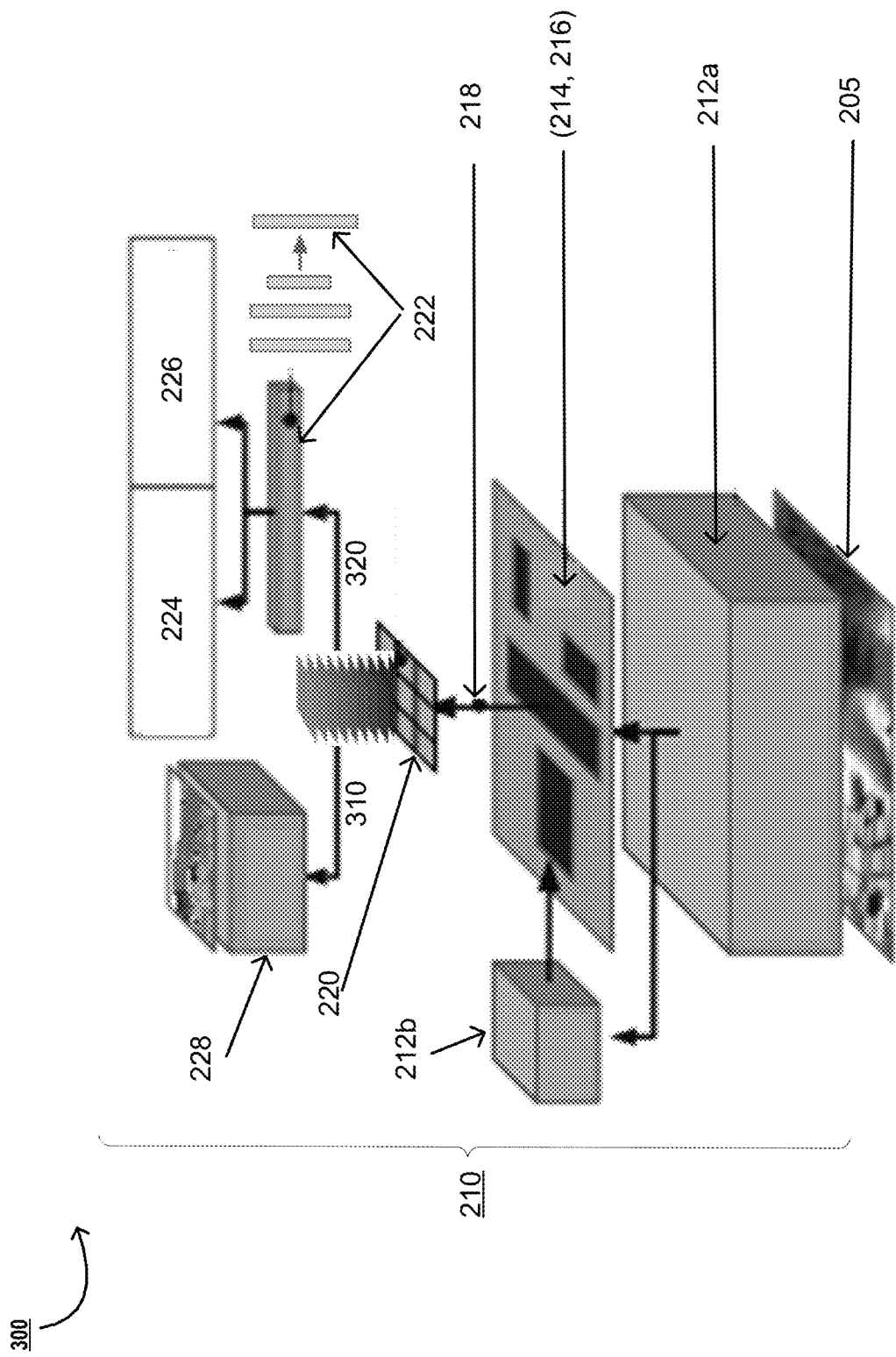
Figure 4:
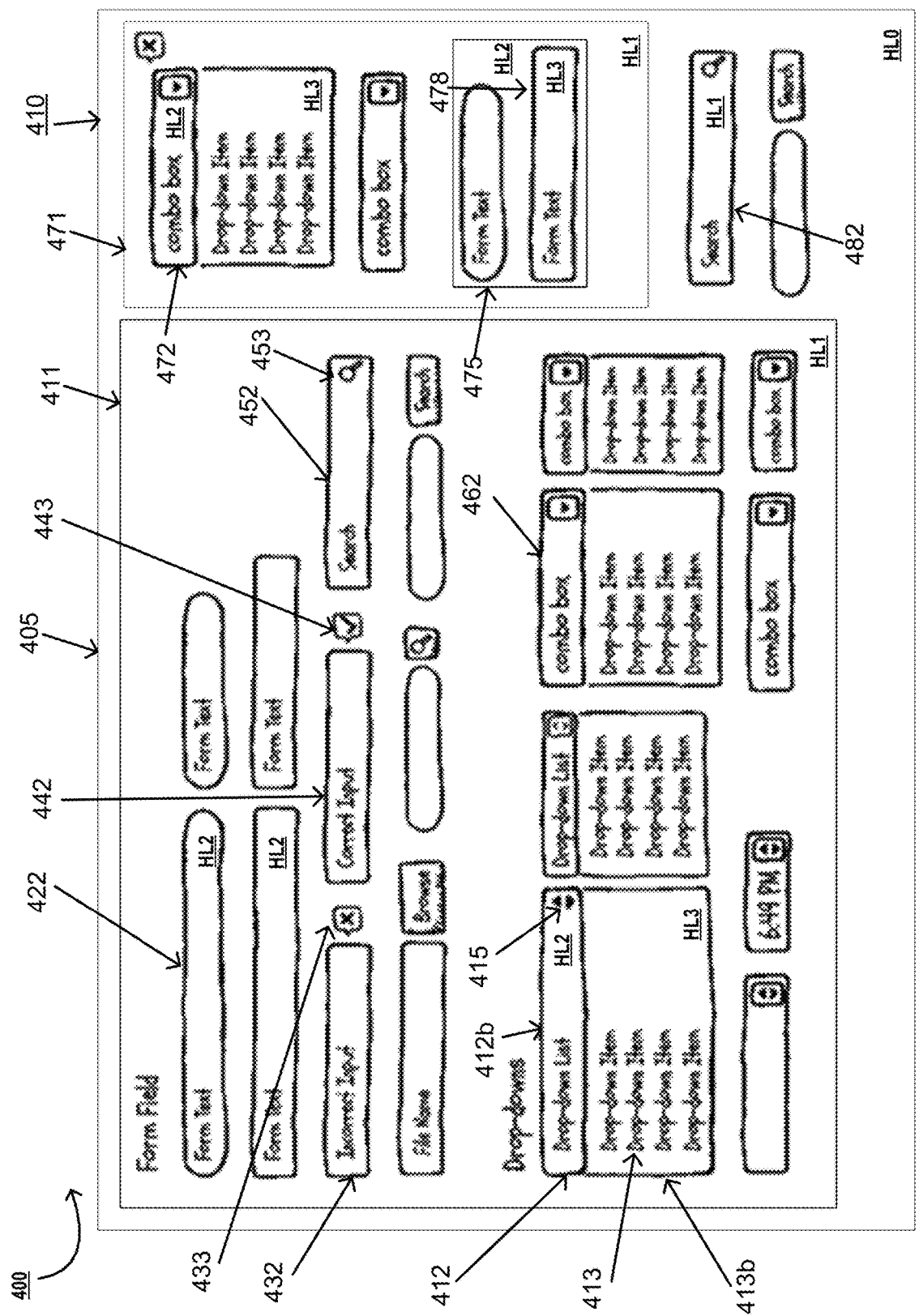
Figure 5:
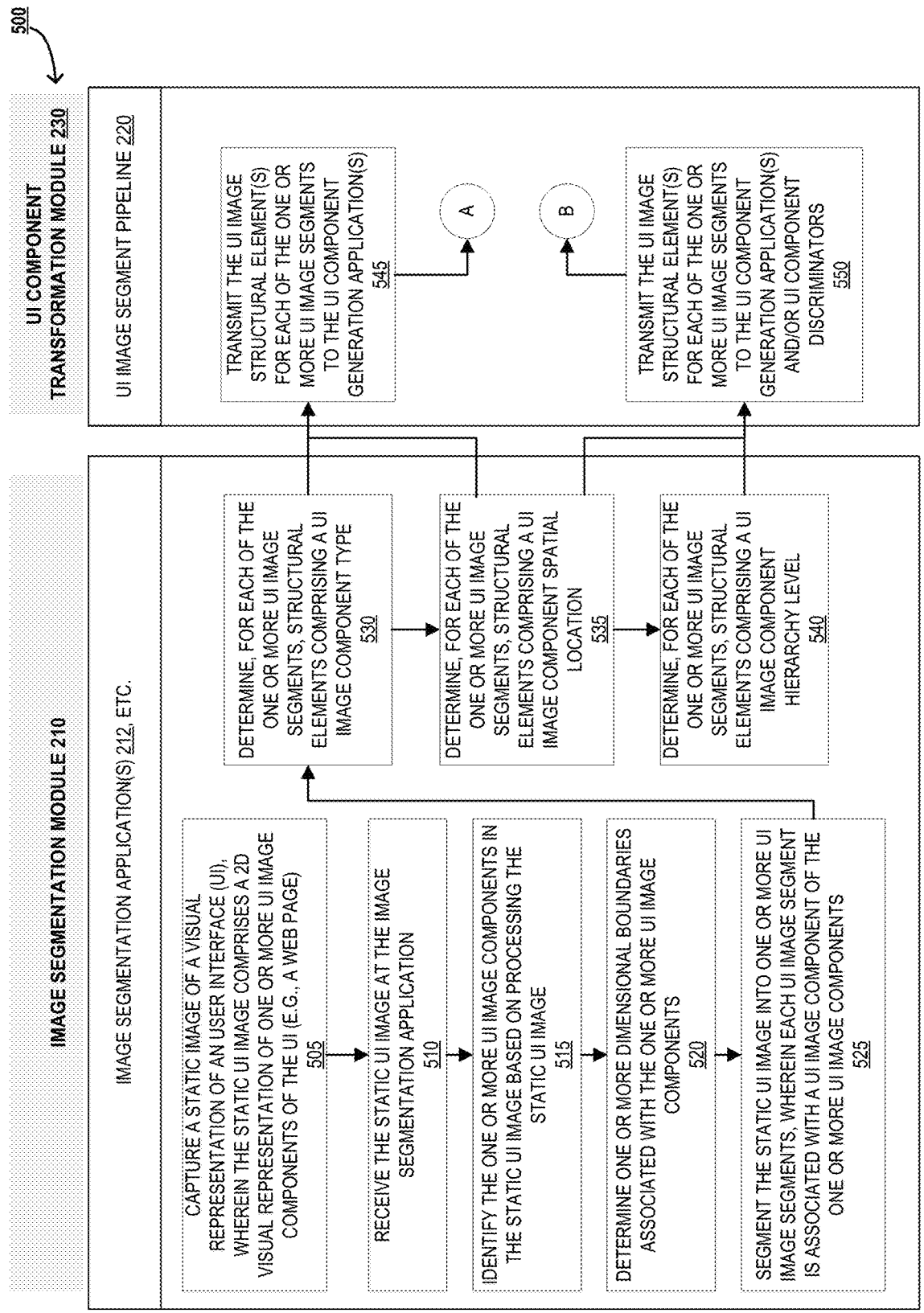
Figure 6:
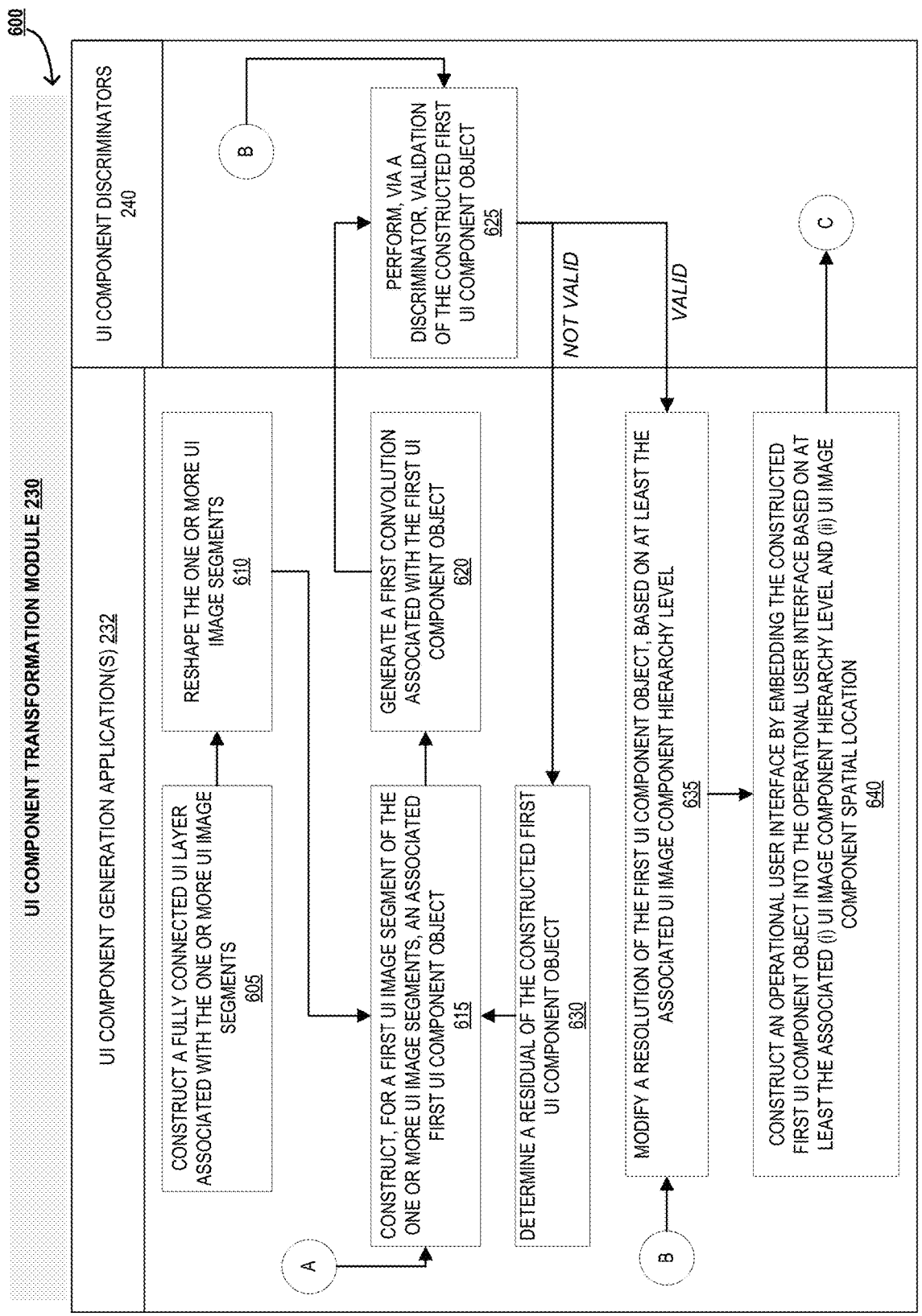

Having thus described embodiments of the invention in general terms, reference will now be made to the accompanying drawings, wherein:

FIG. 1 depicts a user interface construction system environment 100, in accordance with one embodiment of the present invention;

FIG. 2 depicts a user interface technology platform module environment 200, in accordance with one embodiment of the present invention;

FIG. 3 depicts an image segmentation and transformation environment 300, in accordance with one embodiment of the present invention;

FIG. 4 depicts a illustrative representation 400 of a static user interface image in accordance with one embodiment of the present invention;

FIG. 5 depicts a high level process flow 500 for image segmentation and user interface component transformation, in accordance with one embodiment of the present invention;

FIG. 6 depicts a high level process flow 600 for user interface component transformation and validation, in accordance with one embodiment of the present invention; and FIG. 7 depicts a high level process flow 700 for actionable user interface component and operational user interface construction, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource is typically associated with and/or maintained by an entity.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

As discussed previously, in conventional systems, creating these user interfaces is typically only possible from a front-end perspective that is end-use technology specific (e.g., specific to the operating system or application platform that the interface is being created for) and requires a dedicated interface creation applications that are specific to the end-use technology. This conventional process, however, is heavily reliant on and specific to the end-use technology and the created user interfaces or intermediary steps involved in the creation are not portable to a different end-use technology. Moreover, this conventional process requires technology specific skills, is time intensive and laborious. The present invention alleviates these drawback and provides a novel system for constructing technology-agnostic user interfaces that are easily portable across various operating system frameworks.

Moreover, with respect to image processing, conventional systems are configured for at best character recognition from hand-drawn images. Conventional systems however, are not capable of distinguishing UI image components from mere characters in a hand-drawn images. Moreover, conventional systems are incapable of identifying UI image component objects in hand drawn images/wireframes, much less identifying boundaries, hierarchies and the like associated with UI image components, and transforming them into compatible actionable UI component objects embedded in a user interface. By not being able to accurately determine boundaries of UI image components, conventional systems are unable to perform accurate image segmentation imperative for the steps of user interface construction. Embodiments of the present invention alleviate the deficiencies of existing systems and achieve other advantages by providing apparatuses (e.g., a system, computer program product and/or other devices) and methods for user interface construction based on based on image segmentation, transforming interface image segments static images into actionable user interface components, and construction of user interface objects, as described with respect to FIGS. 1-7 herein.

FIG. 1 illustrates a user interface construction system environment 100, in accordance with some embodiments of the present invention. As illustrated in FIG. 1, a UI processing system 108 is in operative communication with and operatively coupled to, via a network 10, a user device 104, an entity server 106, a technology system 105, and an image capture device 180. In this way, the UI processing system 108 can send information to and receive information from the user device 104, the entity server 106, the technology system 105 and the image capture device 180. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, a UI technology platform module 200 of the UI processing system 108, is configured for image segmentation, transformation of user interface image segments, and construction of user interface objects, thereby fundamentally transforming a static representation of a user interface into functional and actionable user interface components, and also connecting back-end construction of user interfaces with front end components, which would not be possible in the absence of the present invention.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may either provide static UI images (e.g., via the image capture device 180), request construction of an operational UI based on transforming static UI images, and/or receive/utilize the constructed operation UI. As such, in some embodiments, the user 102 may be associated with the entity and/or a financial institution that may desire the constructed operational UI.

FIG. 1 also illustrates a user system 104. The user device 104 may be, for example, a desktop personal computer, a mobile system, such as a cellular phone, smart phone, personal data assistant (PDA), laptop, a server system, another computing system and/or the like. The user device 104 generally comprises a communication device 112, a processing device 114, and a memory device 116. The user device 104 is typically a computing system that is configured to enable user and device authentication for access to technology event data, request construction of UIs, receive the constructed UIs, etc. The processing device 114 is operatively coupled to the communication device 112 and the memory device 116. The processing device 114 uses the communication device 112 to communicate with the network 101 and other devices on the network 101, such as, but not limited to, the entity server 106, the UI processing system 108 and the technology system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the UI processing system 108 and/or the entity system 106 are configured to cause the processing device 114 to execute the computer readable instructions 110, thereby causing the user device 104 to perform one or more functions described herein, for example, via the user application 122 and the associated user interface of the user application 122. In some embodiments, the associated user interface of the user application 122 may be different user interface than the UI constructed by the UI processing system 108 (e.g., the associated user interface of the user application 122 may be configured to request the construction of the user interface, configured to capture and/or provide a static UI image associated with the UI desired to be constructed, configured for receiving user authentication credentials etc.). In some embodiments, the associated user interface of the user application 122 may be the same as or similar to the UI constructed by the UI processing system 108 (e.g., the constructed UI (partially or fully complete) and/or associated information may be presented to the user via the associated user interface of the user application 122).

FIG. 1 also illustrates an image capture device 180. In some embodiments, the image capture device 180 is typically configured to capture a 2-D image of a physical, tangible object, thereby converting it into an electronic file/document. The image capture device 180 may be/or may comprise, for example, a scanner, a camera, a light sensor, a magnetic reader, and/or the like. In some embodiments, the image capture device 180 is a part of, or is integral with the UI processing system 108. In some embodiments, the image capture device 180 is a part of, or is integral with the entity server 106. In some embodiments, the image capture device 180 is a part of, or is integral with the user device 104. In some embodiments, the image capture device 180 is configured to construct static UI image (e.g., a static 2-D UI image) comprising hand-drawn images, wireframes, and/or the like associated with a UI desired to be constructed (e.g., a web page, a mobile/smartphone application interface, etc.). Typically, the hand-drawn images, wireframes, and/or the like associated with a UI desired to be constructed are hand-drawn or otherwise inscribed/provided on a paper or another physical/tangible object (e.g., as illustrated by FIG. 4), which are captured/scanned by the image capture device 180, and transformed to construct the static UI image (e.g., in 2-D) as an electronic file/document or image file (e.g., in JPEG, Exif, JFIF, GIF, BMP, TIFF, or another suitable format), e.g., with a predetermined aspect ratio and/or resolution.

As further illustrated in FIG. 1, the UI processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs, an image segmentation module 210 (having image segmentation application(s) 212, etc.), an UI component transformation module 230 (having UI component generation application(s) 232, discriminator(s) 244, etc.), and/or an actionable UI component construction module 250 (having an UI Encoder 254, an image technology stack mapping application 256, etc.) of the UI technology platform module 200 (illustrated in FIG. 2), based on computer-readable instructions thereof, which may be stored in a memory device, for example, executing computer readable instructions 154 or computer-readable program code 154 stored in memory device 150 to perform one or more functions associated with a UI technology platform module 200

The processing device 148 is operatively coupled to the communication device 146 and the memory device 150. The processing device 148 uses the communication device 146 to communicate with the network 101 and other devices on the network 101, such as, but not limited to the entity server 106, the technology system 105, the image capture device 180 and the user system 104. As such, the communication device 146 generally comprises a modem, server, or other device for communicating with other devices on the network 101.

As further illustrated in FIG. 1, the UI processing system 108 comprises the computer-readable instructions 154 stored in the memory device 150, which in one embodiment includes the computer-readable instructions 154 of the UI technology platform module 200. In some embodiments, the computer readable instructions 154 comprise executable instructions associated with the image segmentation module 210 (having image segmentation application(s) 212, etc.), the UI component transformation module 230 (having UI component generation application(s) 232, discriminator(s) 244, etc.), and/or the actionable UI component construction module 250 (having the UI Encoder 254, the image technology stack mapping application 256, etc.) associated with the UI technology platform module 200, wherein these instructions, when executed, are typically configured to cause the applications or modules to perform/execute one or more steps described herein. In some embodiments, the memory device 150 includes data storage 152 for storing data related to the system environment, but not limited to data created and/or used by the UI technology platform module 200 and its components/modules. The UI technology platform module 200 is further configured to perform or cause other systems and devices to perform the various steps in processing electronic records, as will be described in detail later on.

As such, the processing device 148 is configured to perform some or all of the image segmentation, transformation, and analysis and user interface construction steps described throughout this disclosure, for example, by executing the computer readable instructions 154. In this regard, the processing device 148 may perform one or more steps singularly and/or transmit control instructions that are configured to the image segmentation module 210 (having image segmentation application(s) 212, etc.), the UI component transformation module 230 (having UI component generation application(s) 232, discriminator(s) 244, etc.), and/or the actionable UI component construction module 250 (having the UI Encoder 254, the image technology stack mapping application 256, etc.) associated with the UI technology platform module 200, entity server 106, user device 104, and technology system 105 and/or other systems and applications, to perform one or more steps described throughout this disclosure. Although various data processing steps may be described as being performed by the UI technology platform module 200 and/or its components/ applications and the like in some instances herein, it is understood that the processing device 148 is configured to establish operative communication channels with and/or between these modules and applications, and transmit control instructions to them, via the established channels, to cause these module and applications to perform these steps.

Embodiments of the UI processing system 108 may include multiple systems, servers, computers or the like maintained by one or many entities. FIG. 1 merely illustrates one of those systems 108 that, typically, interacts with many other similar systems to form the information network. In one embodiment of the invention, the UI processing system 108 is operated by the entity associated with the entity server 106, while in another embodiment it is operated by a second entity that is a different or separate entity from the entity server 106. In some embodiments, the entity server 106 may be part of the UI processing system 108. Similarly, in some embodiments, the UI processing system 108 is part of the entity server 106. In other embodiments, the entity server 106 is distinct from the UI processing system 108.

In one embodiment of the UI processing system 108, the memory device 150 stores, but is not limited to, the UI technology platform module 200 comprising the image segmentation module 210 (having image segmentation application(s) 212, etc.), the UI component transformation module 230 (having UI component generation application(s) 232, discriminator(s) 244, etc.), and/or the actionable UI component construction module 250 (having the UI Encoder 254, the image technology stack mapping application 256, etc.), as will be described later on with respect to FIG. 2. In one embodiment of the invention, the UI technology platform module 200 may associated with computer-executable program code that instructs the processing device 148 to operate the network communication device 146 to perform certain communication functions involving the technology system 105, the user device 104 and/or the entity server 106, as described herein. In one embodiment, the computer-executable program code of an application associated with the UI technology platform module 200 may also instruct the processing device 148 to perform certain logic, data processing, and data storing functions of the application.

The processing device 148 is configured to use the communication device 146 to receive data, such as electronic data files (e.g., static UI images comprising hand-drawn images, wireframes, etc.), receive requests for constructing operational UIs, transmit and/or cause display of constructed operational UIs and the like. In the embodiment illustrated in FIG. 1 and described throughout much of this specification, the UI technology platform module 200 may perform one or more of the functions described herein, by the processing device 148 executing computer readable instructions 154 and/or executing computer readable instructions associated with one or more application(s)/devices/components of the UI technology platform module 200.

As illustrated in FIG. 1, the entity server 106 is connected to the UI processing system 108 and may be associated with a UI component database, UI technology code database, may be associated with UI data sources, may be associated with a financial institution network, etc. In this way, while only one entity server 106 is illustrated in FIG. 1, it is understood that multiple network systems may make up the system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the UI processing system 108. The UI processing system 108 may communicate with the entity server 106 via a secure connection generated for secure encrypted communications between the two systems for communicating data for processing across various applications.

As further illustrated in FIG. 1, in some embodiments, the technology event processing system environment 100 further comprises a technology system 105, in operative communication with the UI processing system 108, the entity server 106, and/or the user device 104. Typically, the technology system 105 comprises a communication device, a processing device and memory device with computer readable instructions. In some instances, the technology system 105 comprises a first database/repository comprising UI component objects, and/or a second database/repository comprising functional source code associated with UI component objects. These applications/databases may be operated by the processor executing the computer readable instructions associated with the technology system 105, as described previously. In some instances, the technology system 105 is owned, operated or otherwise associated with third party entities, while in other instances, the technology system 105 is operated by the entity associated with the systems 108 and/or 106. Although a single external technology system 105 is illustrated, it should be understood that, the technology system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates the UI technology platform module environment 200 for user interface construction based on image segmentation, transformation of user interface image segments, and construction of user interface objects. The technology platform module is also configured for fundamentally transforming a static representation of a user interface into functional and actionable user interface components. In some embodiments, computer readable instructions 154, when executed by the processing device 148 of the UI processing system 108 (hereinafter referred to as "the system"), are typically configured to cause the modules, applications, and other components of the technology platform module environment 200 to perform one or more functions as described herein. The UI technology platform module 200 typically comprises an image segmentation module 210, an UI component transformation module 230 and an actionable UI component construction module 250, in operative communication with each other.

In some embodiments, the term "module" as used herein may refer to a functional assembly (e.g., packaged functional assembly) of one or more associated electronic components and/or one or more associated technology applications, programs, and/or codes. Moreover, in some instances, a "module" together with the constituent electronic components and/or associated technology applications/programs/codes may be independently operable and/or may form at least a part of the system architecture. In some embodiments, the term "module" as used herein may refer to at least a section of a one or more associated technology applications, programs, and/or codes and/or one or more associated electronic components.

The UI technology platform module 200 typically comprises the image segmentation module 210 comprising image segmentation application(s) 212 as also described in detail below, e.g., with respect to FIGS. 3 and 5. In some embodiments, the image segmentation application(s) 212 are associated with or form a Mask Regional Convolutional Neural Network (Mask RCNN). Typically, the image capture device 180 captures visual representations of hand-drawn images, wireframes, and/or the like associated with a UI desired to be constructed and constructs a static UI image 205 (e.g., based on instructions from the system 108), as discussed with respect to FIG. 1. The static UI image 205 is received at the UI technology platform module 200. The static UI image 205 typically comprises a 2D visual representation of one or more UI image components of the UI desired to be constructed (e.g., a web page, a mobile/smartphone application interface, etc.). The image segmentation application(s) 212 typically receive the static UI image 205, and perform one or more image processing steps such as identifying the one or more UI image components in the static UI image, segmenting the static UI image into one or more UI image segments, such that UI image segment is associated with a UI image component of the one or more UI image components, etc. (e.g., as described with respect to blocks 510-525 of FIG. 5). The image segmentation application(s) 212 may also determine UI image structural elements (214, 216) comprising a UI image component type, a UI image component spatial location, a UI image component hierarchy level, etc., for each of the one or more UI image segments (e.g., as described with respect to blocks 530-540 of FIG. 5). The image segmentation application(s) 212 may then input the UI image structural elements 214 (e.g., a UI image component type, and/or a UI image component spatial location) and/or UI image segments to an UI Image segment pipeline 220a that is configured to transmit the UI image structural elements 214 to UI component generation application(s) 232 of the UI component transformation module 230 (e.g., as described with respect to block 545 of FIG. 5). The image segmentation application(s) 212 may then input the UI image structural elements 216 (e.g., a UI image component hierarchy level, and/or a UI image component spatial location) and/or UI image segments to an UI Image segment pipeline 220b that is configured to transmit the UI image structural elements 216 to UI component generation application(s) 232 and/or UI component discriminators 240 of the UI component transformation module 230 (e.g., as described with respect to block 550 of FIG. 5).

The UI component transformation module 230 comprises UI component generation application(s) 232, UI component discriminator(s) 240 (also referred to as discriminator application(s) 240, or UI component discriminator assembly 240), etc. In some embodiments, the UI component generation application(s) 232 are associated with or form an Attentional Generative Network (AGN) and/or a Generative Adversarial Network (GANs) (e.g., an Attention Generative Adversarial Network (Attn GAN) and/or a Self-Attention Generative Adversarial Network). As such, the UI component transformation module 230 is implemented, in some embodiments herein, as a system of two neural networks contesting with each other in a zero-sum game framework. As illustrated in FIG. 2, in some embodiments, (i) the UI component generation application(s) 232 constitute, form and/or are associated with a first network or generative network (e.g., a first neural network or generative neural network) of the UI component transformation module 230 network, which generates UI component objects. While, (ii) the UI component discriminator(s) 240 constitute, form and/or are associated with a second network or discriminative network (e.g., a second neural network or discriminative neural network) of the UI component transformation module 230 network, which validates, evaluates, processes, tests, and/or otherwise assesses the UI component objects generated by the first network or generative network. As used herein, "neural networks" may comprise an interconnected group of artificial neurons or nodes that exhibit complex global behavior, in an adaptive manner such that the neural network may change its structure based on external or internal information that flows through the network, in some embodiments.

The UI component generation application(s) 232 comprise one or more attentive component building applications $A_1, A_2, \ldots$ and/or $A_N$ (234a, 234b, ... and/or 234n), each being associated with constructing UI component objects for a particular component hierarchy level of the UI image segments based on received UI image structural elements 214 (e.g., a UI image component type) from the UI Image segment Pipeline 220a. For instance, for a static UI image 205 having 5 hierarchy levels, N may be equal to 5, with each attentive component building application $A_1$-$A_5$ being associated with a particular hierarchy level. Typically, the hierarchy levels of attentive component building applications $A_1, A_2, \ldots$ and/or $A_N$ are in the ascending order, with $A_1$ being associated with the first/lowest level of hierarchy and the $A_N$ being associated with the last/highest level of hierarchy. In some embodiments, the UI component generation application(s) 232 is structured for transforming/mapping from latent data or latent space/variables to a desired data construction/distribution. Moreover, the UI component generation application(s) 232 are typically structured to be dynamically self-learning, e.g., based on the signals/triggers/commands received from the second network or discriminative network, e.g., from the UI component discriminator(s) 240 in particular.

The UI component generation application(s) 232 comprises a base transformation application $F_0$ 2360, typically associated with a zero/base hierarchy level, e.g., webpage/page background level for transforming received UI image segments and processing structural elements 216 (e.g., a UI image component hierarchy level, and/or a UI image component spatial location) from the UI Image segment Pipeline 220b. The base transformation application $F_0$ 2360 comprises a first transformation program 2350 (also referred to as a fully connected layer construction and reshape program 2350) that is configured to construct a fully connected UI layer out of the one or more UI image segments received from the image segmentation application(s) 212, via the pipeline 220b and/or also reshape the one or more UI image segments. The base transformation application $F_0$ 2360 further comprises one or more second transformation programs 2370 (also referred to as an image structure upsampling program 2370) that are configured to successively modify/transform the structure of the fully connected layer received from the first transformation program 2350, e.g., by altering/modifying/transforming the resolution, aspect ratio, etc. of the image segments to a predetermined optimum required for further processing.

The UI component generation application(s) 232 further comprise one or more component transformation applications $F_1$, $F_2$, . . . and/or $F_N$ (236a, 236b, . . . and/or 236n), each being associated with transforming UI component objects constructed by an associated attentive component building application $A_1$, $A_2$, . . . and/or $A_N$ (234a, 234b, . . . and/or 234n) for a particular component hierarchy level of the UI image segments. Each of the one or more component transformation applications $F_1$, $F_2$, . . . and/or $F_N$ (236a, 236b, . . . and/or 236n) may further comprise a third transformation program (233a, 233b, . . . and/or 233n) configured for receiving and/or performing preliminary processing/analysis of constructed UI component objects from the associated attentive component building applications $A_1$, $A_2$, . . . and/or $A_N$ (234a, 234b, . . . and/or 234n). Each of the one or more component transformation applications $F_1$, $F_2$, . . . and/or $F_N$ (236a, 236b, . . . and/or 236n) may further comprise one or more fourth transformation programs (238a, 238b, . . . and/or 238n) configured for successively determining a residual of the constructed UI component object by the associated attentive component building applications $A_1$, $A_2$, . . . and/or $A_N$ (234a, 234b, . . . and/or 234n). Each of the one or more component transformation applications $F_1$, $F_2$, . . . and/or $F_N$ (236a, 236b, . . . and/or 236n) may further comprise a fifth transformation program or image structure upsampling program (237a, 237b, . . . and/or 237n), similar to the one or more second transformation programs 2370, that is configured to modify/transform the structure of the constructed UI component object by the associated attentive component building applications $A_1$, $A_2$, . . . and/or $A_N$ (234a, 234b, . . . and/or 234n), e.g., by altering/modifying/transforming the resolution, aspect ratio, etc. of the UI component object.

The UI component generation application(s) 232 further comprise a base convolution application $G_0$ 2390, typically associated with performing a convolution transformation of a transformed zero/base hierarchy level webpage from an associated base transformation application $F_0$ 2340 of the zero/base hierarchy level. The UI component generation application(s) 232 further comprise one or more convolution applications $G_1$, $G_2$, . . . and/or $G_N$ (239a, 239b, . . . and/or 239n) each associated with performing convolution transformations of transformed UI component objects from an associated component transformation application $F_1$, $F_2$, . . . and/or $F_N$ (236a, 236b, . . . and/or 236n), thereby generating a convolution associated with the UI component object.

The UI component transformation module 230 also comprises the discriminator(s) 240 or discriminator modules 240 (240a, 240b, . . . , and/or 240n+1), etc., e.g., in the second network or discriminative network. Each discriminator module (240a, 240b, . . . , and/or 240n+1) may comprise a transformation application (242a, 242b . . . , and/or 252 (242n+1)) configured to modify a resolution of an UI component object received, based on at least the associated UI image component hierarchy level, received from the associated UI component generation application(s) 232.

Each discriminator module (240a, 240b, . . . , and/or 240n+1) may comprise a discriminator application (244a, 244b . . . , and/or 244n+1) configured to validate the constructed first UI component object, based on at least the received UI image structural elements 216 (e.g., UI image component hierarchy level, and/or UI image component spatial location) from the UI Image segment Pipeline 220b. In some embodiments, the discriminator(s) 240 of the second network or discriminative network are structured to discriminate between instances from the true data structures/distribution associated with the UI image segments (e.g., retrieved from the UI Image segment Pipeline 220b) and UI component objects produced by the associated UI component generation application(s) 232 of the first network or generative network, thereby dynamically training the first network or generative network in real-time (i.e., aiding in the dynamic self-learning of the first/generative network). In some embodiments, the system 108 performs initial training of the discriminator(s) 240 of the second/discriminative network, e.g., by transmitting UI segment samples and causing the discriminator(s) 240 to validate the UI segment samples and/or associated UI component objects, until the discriminator(s) 240 of the second/discriminative network attain a predetermine level of accuracy. In some embodiments, the UI component generation application(s) 232 of the first/generative network are seeded with a randomized UI segment input that is sampled from a predefined latent data/space (e.g. a multivariate normal distribution). Subsequently, the system 108 causes the discriminator(s) 240 to analyze/process/evaluate the samples synthesized by the UI component generation application(s) 232 of the first/generative network. In some embodiments, backpropagation may also applied in both networks so that the UI component generation application(s) 232 construct better UI component objects, while the discriminator(s) 240 become more skilled at validating them with higher accuracy. In some embodiments, one or more of the UI component generation application(s) 232 are associated with a deconvolutional neural network, while one or more of the discriminator(s) 240 are associated with a convolutional neural network.

The UI component generation application(s) 232 are configured to construct an operational user interface by sequentially embedding the constructed UI component objects into the operational user interface, in an ascending hierarchy as they are constructed, based on at least the associated (i) UI image component hierarchy level and (ii) UI image component spatial location, and (iii) after successful validation by the discriminators 240.

FIG. 2 further illustrates an actionable UI component construction module 250 on operative communication with the UI component transformation module 230. The transformation application 252 is configured for transform the operational user interface based on predetermined visual parameters. The UI component construction module 250 comprises a UI encoder 254 configured to determine an operating system framework associated with the operational user interface, and generate functional source code for each UI component object of the operational user interface based on at least the operating system framework. The UI component construction module 250 further comprise a image technology stack mapping application 256 configured to map the functional source code with an associated UI component object, for each UI component object of the operational user interface, thereby constructing actionable UI component objects in the operational user interface 258. The actionable UI component construction module 250 may then transmit and/or cause display of the operational user interface 258 having the one or more actionable UI component objects.

FIG. 3 illustrates an image segmentation and transformation environment 300, in accordance with one embodiment of the present invention. A part of or the entirety of the image segmentation and transformation environment 300 may be comprised in the image segmentation module 210. As discussed previously, the static UI image 205 is received at the image segmentation module 210. In some embodiments, the image segmentation application(s) 212 comprises a convolutional neural network application (CNN) 212a, and a region proposal network (RPN) application 212b, together forming a regional convolutional neural network (RCNN). The image segmentation application(s) 212, i.e., the RCNN, is configured to construct a feature map comprising the UI image structural elements (214, 216). The image segmentation and transformation environment 300 may further comprise a Region of Interest (RoI) Align application 218 configured for performing a bilinear interpolation on the feature map, and ensures proper alignment, and thereby constructs a fixed size feature map that is transmitted via the pipelines 220 (220a, 220b). As further illustrated by FIG. 3, the image segmentation and transformation environment 300 further constructs fully connected layers 222 having a box regression 224 and a classification 226. As further illustrated by FIG. 3, the image segmentation and transformation environment 300 further comprises a mask branch 228.

As discussed, in some embodiments, the image segmentation application(s) 212 comprises the convolutional neural network application (CNN) 212a, and the region proposal network (RPN) application 212b, together forming a regional convolutional neural network (RCNN). In some instances, the convolutional neural network application (CNN) 212a comprises an input and an output layer, as well as multiple hidden layers. These hidden layers of the CNN application 212a may comprise of convolutional layers, pooling layers, fully connected layers and normalization layers, such that the CNN application 212a is structured to apply a convolution operation to the input static UI image 205, passing the result to the next layer. The early layers are configured to detect low level features (edges and corners), and later layers successively detect higher level features (car, person, sky). In some embodiments, for example, the CNN application 212a comprises ResNet50 or ResNet101 that serves as a feature extractor. In some instances, for example, the static UI image 205 and/or its UI components are transformed from 1024×1024 px×3 (RGB) to a feature map (214, 216) of shape 32×32×2048.

The region proposal network (RPN) application 212b is structured for determining whether a particular UI image component (e.g., UI component 412 of FIG. 4) of the one or more UI image components in the static UI image 205 is in the background or foreground, refile the UI image component, etc. The RPN application 212b may comprise one or more regional proposals that may be analyzed by a classifier and a regressor to determine occurrence of UI image components in the static UI image 205. As used herein, the regions of the static UI image 205 that the RPN application 212b scans over are referred to as anchors. The RPN application 212b may determine/configure/set one or more anchors (e.g., 9 anchors) in the static UI image 205 at a position of an image with different sizes and shapes, thereby improving detection of regions. As an example, in some instances, there are about 200K anchors of different sizes and aspect ratios, and are configured by the RPN application 212b such that they overlap to cover as much of the static UI image 205 as possible. In some embodiments, the RPN application 212b further performs Bounding Box Refinement. For instance, the RPN application 212b may determine that a foreground anchor (also called positive anchor) is not be centered perfectly over the UI object/component. In response, the RPN application 212b may further estimates a delta (% change in x, y, width, height) to refine the anchor box to fit the UI object/component correctly.

In some embodiments, the RPN application 212b provides improved scanning and image processing in much quicker or nearly instantaneous rate, because, the RPN application 212b does not scan over the static UI image 205 directly. Instead, the RPN application 212b scans over the backbone feature map (comprising the UI image structural elements (214, 216)) that is constructed in conjunction with or by the CNN application 212a. This allows the RPN application 212b to reuse the extracted features efficiently and avoid duplicate calculations entirely. In some embodiments, for example, the RPN application 212b may run in about 10 micro seconds. In this way the UI image components are identified, detected and/or processed by the CNN application 212a together with the RPN application 212b, which then construct the feature map comprising the UI image structural elements (214, 216), in some embodiments.

The Region of Interest (RoI) Align layer/application 218 and the Mask Branch application 228 together with the RCNN architecture above, form the Mask RCNN architecture. Next, the RoI Align application 218 and the mask branch application 228 perform the image segmentation process to construct one or more UI image segments performed by the, as described below, via the Mask RCNN architecture. As illustrated in FIG. 3, in some embodiments, the Mask RCNN architecture comprises a branch 310 for predicting an object mask in parallel, with the existing branch 320 for bounding box recognition for performing the image segmentation.

The image segmentation and transformation environment 300 may further comprise the RoI Align layer/application 218 configured for performing a bilinear interpolation on the feature map, and ensures proper alignment, and thereby constructs the fixed size feature map that is transmitted via the pipelines 220 (220a, 220b). The RoI Align layer/application 218 is further configured to (i) determine a specific class of each UI object/component (e.g., UI image component type, hierarchy level, etc.) in the RoI and (ii) perform further Bounding Box Refinement similar to that performed by the RPN application 212b. Furthermore, in some embodiments, the Mask Branch application 228 is a convolutional network that takes the positive regions selected by the RoI Align layer/application 218 and generates masks for each of them. In some embodiments, the masks are of soft mask type, represented by float numbers, so they hold more details than binary masks. In comparison with the UI image component detection by the RCNN architecture above, the image segmentation process typically requires a higher accuracy of boundary detection. Accordingly, in the image segmentation process, the system typically classifies each pixel accurately. This provides an improvement to the image processing technology by preventing misalignment between the RoI Allign layer and the extracted features (214, 216). Moreover because the RoI align layer/application 218 uses a bilinear interpolation on feature map and avoids quantization, unavoidable shifts between generated mask and original instance inevitably caused by quantization are completely eliminated.

As further illustrated by FIG. 3, the image segmentation and transformation environment 300 further constructs fully connected layers 222 having the box regression 224 (e.g., box coordinates, UI component spatial location, etc.) and the classification 226 (e.g., class scores, class type, UI image component type, hierarchy level, etc.).

FIG. 4 illustrates an illustrative representation 400 of a static user interface image 205, in accordance with one embodiment of the present invention. As discussed, the image capture device 180 is configured to construct static UI image 205 from visual representation of the desired UI to be constructed (e.g., a web page, a mobile/smartphone application interface, etc.). FIG. 4 illustrates a non-limiting example of a tangible/physical hand drawn sketch/visual representation 410 of the desired UI to be constructed that is hand drawn on a paper by a user. As illustrated, the hand drawn sketch/visual representation 410 of the desired UI to be constructed comprises 2D visual representation of one or more UI image components 411, 412, 413, 415, 422, 432, 433, 442, 443, 452, 462, 471, 472, 475, 478, and/or 482, etc., each being associated with a particular hierarchy level (indicated in FIG. 4 as "HL", e.g., base hierarchy level HL0, first hierarchy level HL1, second hierarchy level HL2, third hierarchy level HL3, . . . $N^{th}$ hierarchy level HLn (not illustrated) in an ascending order of hierarchy). The one or more UI image components may comprise one or more of a window/container type (e.g., browser window 405, child window (411, 475), pop-up window 472, dialog box, frame, canvas, cover flow, modal window, accordion, etc.) image component, a menu type (e.g., menu bar, context menu, pie menu, drop down list 412 having drop down items 413, combo box (462, 472) etc.), icon type (e.g., an icon representing a particular command like a search icon 453 superimposed over a search box (452, 482), scroll icon 415, select icon, open icon, etc.), control type (e.g., widgets, buttons, navigation controls, tabs, links, scrollbars, sliders, spinners, toolbars, ribbons, etc.), input type (e.g., radio button, check box, cycle button, text box (422, 478), etc.), output type (e.g., text boxes (432, 442), labels (433, 443), tooltips, balloons, status bars, progress bars, infobars, visual content boxes, etc.), etc., and/or a suitable combination thereof.

Each UI image component typically comprises or is associated with a component boundary, either provided physically on the hand drawn sketch/visual representation 410 or not physically present or perceptible on the hand drawn sketch/visual representation 410. For instance, the UI image component 412 comprises a component boundary 412b and the UI image component 413 comprises a component boundary 413b, which may then be identified and analyzed by the image segmentation application(s) 212 during processing (e.g., at block 520 of FIG. 5). Although, these component boundaries (412b, 413b) are illustrated as visible drawings (e.g., lines or boxes) for illustrative purposes, in some instances, at least a portion or the entirety of component boundaries are not physically present or perceptible on the hand drawn sketch/visual representation 410 and are constructed/assigned by the image segmentation application(s) 212 during processing (e.g., at block 520 of FIG. 5).

It is noted that the UI component numbers and the hierarchy level HL are indicated in FIG. 4 for illustrative purposes and ease of description and are not typically present on the hand drawn sketch/visual representation 410. The presence, nature, type, spatial location coordinates and hierarchy level of the UI image components are determined by the system as described herein. For instance, the system may determine that the browser window or page 405 comprises a base hierarchy level HL0, that the window 411 present in the window/page 405 comprises a first hierarchy level HL1, and that the dropdown list component 412 having the scroll button 415 present in the window 411 comprises the second hierarchy level HL2, while the drop down items 413 comprise a third hierarchy level HL3. The system further determines spatial location coordinates of each of the UI image components, either based on absolute coordinates (e.g., using Cartesian/polar/cylindrical coordinates after setting an origin/reference (0,0) at are suitable point on the browser window or page 405 comprising the base hierarchy level HL0), based on relative coordinates indicating relative positions of each of the UI image components (e.g., relative positions of adjacent UI image components, relative positions of superimposed/overlapping UI image components, etc.), based on coordinates of the determined/constructed component boundaries, and/or like.

FIG. 5, illustrates a high level process flow 500 for image segmentation and user interface component transformation, typically performed by the image segmentation module 210, in accordance with one embodiment of the present invention. Specifically, at block 505, the system is configured to capture a static image of a visual representation of an user interface (UI), wherein the static UI Image comprises a 2D visual representation of one or more UI image components of the UI (e.g., a web page), as discussed previously. In some embodiments, the image capture device 180 is typically configured to capture a 2-D image of a physical, tangible object, thereby converting it into an electronic file/document. The image capture device 180 may be/or may comprise, for example, a scanner, a camera, a light sensor, a magnetic reader, and/or the like. In some embodiments, the image capture device 180 is a part of, or is integral with the UI processing system 108. In some embodiments, the image capture device 180 is a part of, or is integral with the entity server 106. In some embodiments, the image capture device 180 is a part of, or is integral with the user device 104. In some embodiments, the image capture device 180 is configured to construct static UI image (e.g., a static 2-D UI image) comprising hand-drawn images, wireframes, and/or the like associated with a UI desired to be constructed (e.g., a web page, a mobile/smartphone application interface, etc.). Typically, the hand-drawn images, wireframes, and/or the like associated with a UI desired to be constructed are hand-drawn or otherwise inscribed/provided on a paper or another physical/tangible object (e.g., as illustrated by FIG. 4), which are captured/scanned by the image capture device 180, and transformed to construct the static UI image (e.g., in 2-D) as an electronic file/document or image file (e.g., in JPEG, Exif, JFIF, GIF, BMP, TIFF, or another suitable format), e.g., with a predetermined aspect ratio and/or resolution. Next, the system is configured to receive the static UI image at the image segmentation application, as indicated by block 510.

As illustrated by block 515, the system is configured to identify the one or more UI image components in the static UI image based on processing the static UI image. The one or more UI image components may comprise one or more of a window/container type (e.g., browser window, child window, pop-up window, dialog box, frame, canvas, cover flow, modal window, accordion, etc.) image component, a menu type (e.g., menu bar, context menu, pie menu, drop down list having drop down items, combo box etc.), icon type (e.g., an icon representing a particular command like a search icon superimposed over a search box, scroll icon, select icon, open icon, etc.), control type (e.g., widgets, buttons, navigation controls, tabs, links, scrollbars, sliders, spinners, toolbars, ribbons, etc.), input type (e.g., radio button, check box, cycle button, text box, etc.), output type (e.g., text boxes, labels, tooltips, balloons, status bars, progress bars, infobars, visual content boxes, etc.), etc., and/or a suitable combination thereof (e.g., as illustrated by FIG. 4).

Next, as illustrated by block 520, the system is configured to determine one or more dimensional boundaries associated with the one or more UI image components. As discussed, each UI image component typically comprises or is associated with a component boundary, either provided physically on the hand drawn sketch/visual representation 410 or not physically present or perceptible on the hand drawn sketch/visual representation 410 and are instead constructed/assigned by the image segmentation application(s) 212 during processing. Next, the system typically segments the static UI image into one or more UI image segments based on at least the component boundaries, wherein each UI image segment is associated with a UI image component of the one or more UI image components, as indicated by block 525.

As illustrated by block 530, the system typically determines, for each of the one or more UI image segments, structural elements comprising a UI image component type, e.g., a window/container type (e.g., browser window type, child window type, pop-up window type, dialog box type, frame type, canvas type, cover flow type, modal window type, accordion type, etc.), a menu type (e.g., menu bar type, context menu type, pie menu type, drop down list type having drop down items, combo box type etc.), icon type (e.g., a search icon type, scroll icon type, select icon type, open icon type, etc.), control type (e.g., widget type, button type, navigation control type, tab type, link type, scrollbar type, slider type, spinner type, toolbar type, ribbon type, etc.), input type (e.g., radio button type, check box type, cycle button type, text box type, search box type etc.), output type (e.g., text box type, label type, tooltip type, balloon type, status bar type, progress bar type, infobar type, visual content box type, etc.), etc.

Also, as illustrated by block 535, the system determines, for each of the one or more UI image segments, structural elements comprising a UI image component spatial location. For instance, the system may determine spatial location coordinates of each of the UI image components, either based on absolute coordinates (e.g., using Cartesian/polar/cylindrical coordinates after setting an origin/reference (0,0) at are suitable point on the browser window or page 405 comprising the base hierarchy level HL0), based on relative coordinates indicating relative positions of each of the UI image components (e.g., relative positions of adjacent UI image components, relative positions of superimposed/overlapping UI image components, etc.), based on coordinates of the determined/constructed component boundaries, and/or like. In some embodiments, the spatial location coordinates also comprise the size and/or shape of the UI image component relative to the rest of the UI image. Finally, the system also determines, for each of the one or more UI image segments, structural elements comprising a UI image component hierarchy level, at block 540, as described with respect to FIGS. 3 and 4. Subsequently, the system transmits the UI image structural element(s) for each of the one or more UI image segments to the UI component generation application(s), as indicated by block 545, via pipeline 220a. In addition, as indicated by block 550, the system transmits the UI image structural element(s) for each of the one or more UI image segments to the UI component generation application(s) and/or UI component discriminators, via pipeline 220b, from where the flow control proceeds to the UI component transformation module 230 described with respect to FIG. 6 below.

FIG. 6, illustrates a high level process flow 600 for user interface component transformation and validation, in accordance with one embodiment of the present invention. Each of the attentive component building applications $A_1$, $A_2$, . . . and/or $A_N$ (234a, 234b, . . . and/or 234n) of the UI component generation application(s) 232, retrieves requisite/pertinent structural elements (e.g., UI image component type, UI image spatial location, etc.) associated with the UI image segments corresponding to the compatible hierarchy level from the pipeline 220a. The UI component generation application(s) 232 also receives the structural elements (e.g., UI image hierarchy level, UI image spatial location, etc.) for each of the one or more image segments, at the base transformation application $F_0$ 2360, e.g., via pipeline 220b.

Typically, the base transformation application $F_0$ 2360 is associated with a zero/base hierarchy level, e.g., webpage/page background level or HL0 and is also configured for performing image pre-processing. The base transformation application $F_0$ 2360 retrieves the structural elements (e.g., UI image hierarchy level, UI image spatial location, etc.) for each of the one or more image segments and/or the one or more UI image segments from the pipeline 220b. Next, as illustrated by block 605, the system, i.e., the first transformation program 2350 (also referred to as a fully connected layer construction and reshape program 2350) the constructs a fully connected UI layer associated with the one or more UI image segments, (e.g., based on at least transforming the UI image segments). The first transformation program 2350 typically comprises a deep learning architecture which operatively connects all the layers associated with the UI image segments. Here, the first transformation program 2350 identifies critical features of the UI image segments and parses them.

However, the visual representations of the desired UI in the static UI image 205, particularly, hand drawn images are typically of inconsistent, varying and/or sometimes incorrect dimensions and sizes. To correct these deficiencies, the system, i.e., the first transformation program 2350 performs shape transformation by reshaping the one or more UI image segments, at block 610. Here, the first transformation program 2350 standardizes the one or more UI image segments of the prior image processing steps. The first transformation program 2350 may then construct a matrix structure of a predetermined format and attributes from the reshaped UI image segments.

Next, one or more second transformation programs 2370 (also referred to as an image structure upsampling program 2370) perform further transformations of the fully connected layers with reshape constructed by the first transformation program 2350. However, the resolution of the fully connected layers with reshape constructed by the first transformation program 2350 typically is defective/unreliable in that due to poor or inconsistent resolution, (i) constructing the associated UI image component objects maybe erroneous and/or (ii) any constructed UI image component objects cannot be correctly validated (e.g., by discriminator modules 240) due to resolution defects in images. To correct these deficiencies, the one or more second transformation programs 2370 perform upsampling transformations of the fully connected layers with reshape. The upsampling transformations may comprise transforming the resolution of the image segments until a predetermined image quality is attained across all of the image segments, so that correct UI image component objects can be constructed and validated with accuracy.

Next, at block 615, the system is configured to construct, an associated UI component object for each of the one or more UI image segments, typically, in ascending order of their hierarchies. The UI component objects are actionable, functional, UI components that are embedded/superimposed onto a webpage to construct the desired UI associated with the static UI image. The UI component generation application(s) 232 comprise one or more attentive component building applications $A_1$, $A_2$, . . . and/or $A_N$ (234a, 234b, . . . and/or 234n), each being associated with constructing UI component objects for a particular component hierarchy level of the UI image segments based on received UI image structural elements 214 (e.g., a UI image component type) from the UI Image segment pipeline 220a. Each one or more attentive component building applications $A_1$, $A_2$, . . . and/or $A_N$ (234a, 234b, . . . and/or 234n) is also referred to as an attention layer. Attentive component building application $A_1$ (234a) constructs UI component objects for UI image segments of the first hierarchy level, the application $A_2$ (234b) constructs UI component objects for UI image segments of the second hierarchy level, . . . application $A_N$ (234n) constructs UI component objects for UI image segments of the $N^{th}$ hierarchy level, until all of the UI component objects of all of the hierarchy levels of the UI images segments have been constructed. The attentive component building applications, focus on each attention layer, object by object, complete the layer before moving onto the next. Although, this process is explained with respect to a constructing a first UI component object for a first UI image segment of the one or more UI image segments of a particular hierarchy level, the steps are substantially similar for each of the UI component objects of the one or more UI image segments. The attentive component building application $A_1$ (234a) extracts UI image structural elements associated with the first UI image segment from pipeline 220 and analyzes the same along with the critical features of the first UI image segment from the base transformation application $F_0$ 2360. The attentive component building application $A_1$ (234a) then constructs an actionable, functional first UI component object that matches the UI image structural elements and critical features of the first UI image segment. In some embodiments, the attentive component building application $A_1$ (234a) extracts component structures, arrangements, shapes, images, and/or the like that match the UI image structural elements and critical features of the first UI image segment from a UI component distribution stored at a first database/repository comprising UI component objects (e.g., of the technology system).

In addition, the system is configured to validate the constructed UI component object. Here, the system typically generates a first convolution associated with the first UI component object, as indicated by block 620, e.g., by the convolution application $G_1$ 239a. The convolution application $G_1$ 239a performs a convolution transformation of the first UI component objects to reduce the object to a predetermined reduced structure (e.g., a reduced structure of a size 3×3 pixels) such that convolution comprises critical or distinctive features of first UI component object (even after the reduction). Performing the convolution transformations prior to validation by the discriminator network, provides yet another advantage and improvement to technology. Validating the functional UI component objects, even if possible, is cumbersome, time intensive and requires immense processing power. Specifically, constructing the convolution with predetermined reduced structure having critical or distinctive features of first UI component object, and validating the convolution by the discriminator module, instead of the functional UI component object, significantly reduces the processing power and operational time required for the discriminator module to evaluate and validate the UI component object.

As indicated by block 625, the system is configured to perform, via a discriminator, validation of the constructed first UI component object. For instance, the discriminator application Di 244b analyses the convolution of the constructed first UI component object in conjunction with UI image structural elements associated with the first UI image segment extracted from pipeline 220b. The discriminator compares the features of the convolution of the constructed first UI component object with that of the UI image structural elements to determine the accuracy of the construction UI component object by the generative network's (i.e., UI component generation application 232).

In response to an unsuccessful validation (i.e., the accuracy being lesser than a predetermined threshold), the system may determine a residual of the constructed first UI component object, as indicated by block 630. The residual indicates how far off or how inaccurate the constructed UI component object is, in comparison with the corresponding UI image segment. This residual is transmitted back to the attentive component building application $A_1$ (234a). The residual is constructed as a trigger signal (i) that indicates a measure of inaccuracy of the constructed UI component object and (ii) that triggers/causes the attentive component building application $A_1$ (234a) to construct a correct UI component object corresponding to the first UI image segment. The residual also had a function in aiding in the self-learning of the attentive component building application $A_1$ (234a) by indicating areas of error. Here, the control flows back to the construction of one or more UI image segments at block 615. The one or more fourth transformation programs (238a, 238b, . . . and/or 238n) of the attentive component building application $A_1$ 234a then analyze the residual and construct a second UI component object corresponding to the first UI image segment. This second UI component object is validated by the discriminator application Di 244b in conjunction with UI image structural elements associated with the first UI image segment extracted from pipeline 220b, as described above. This cycle continues until a successful validation of the UI component object associated with the first UI image segment (i.e., the accuracy being greater than or equal to the predetermined threshold). For instance, the attentive component building application $A_1$ (234a) may also construct third, fourth or $N^{th}$ objects until the successful validation by the discriminator.

In response to a successful validation of the first UI component object (or the $N^{th}$ object associated with the first image segment that has been successfully validated), however, the system is configured to perform an upsampling transformation of the first UI component object, based on at least the associated UI image component hierarchy level (and/or the UI image component spatial location), as illustrated by block 635. This is typically performed by the fifth transformation program or image structure upsampling program 237a of the attentive component building application $A_1$ (234a). Specifically, the upsampling transformation comprises transforming the resolution of the first UI component object, such that the first UI component object is compatible for embedding into the webpage/base layer constructed by the base transformation application $F_0$ 2360. Here, in some embodiments, the system may perform the upsampling transformation in response to determining that the previously constructed first UI component object (untransformed) in not compatible for embedding at the associated (i) the UI image component hierarchy level and/or (ii) the UI image component spatial location.

Next, as illustrated by block 640, the system is configured to construct an operational user interface by embedding, by the attentive component building application $A_1$ (234a), the constructed first UI component object into the operational user interface (e.g., webpage/base layer constructed by the base transformation application $F_0$ 2360) based on at least the associated (i) UI image component hierarchy level and (ii) UI image component spatial location of the associated first UI image segment. The size, spacing, orientation, spatial location and hierarchy of the first UI component object is made compatible/consistent with that of the associated first UI image segment in the static UI image.

In this way, the attentive component building application $A_1$ (234a) constructs corresponding UI component object for each of the UI image segments of hierarchy level 1 (HL1). After successful validation, the attentive component building application $A_1$ (234a) embeds each of the UI component objects of hierarchy level 1 into the operational user interface. Next, the control flows back to the construction of one or more UI image segments at block 615. The attentive component building application $A_2$ (234b) constructs corresponding UI component object for each of the UI image segments of hierarchy level 2 (HL2). After successful validation, the attentive component building application $A_2$ (234b) embeds each of the UI component objects of the second hierarchy level into the operational user interface, correctly superimposed over the objects of the first hierarchy level. This process proceeds, until, the attentive component building application $A_N$ (234n) embeds each of the UI component objects of the highest $N^{th}$ hierarchy level into the operational user interface, correctly superimposed over the objects of the preceding hierarchy levels. In this manner, the system constructs an operational user interface comprising UI component objects associated with all of the UI image segments, i.e., associated with all of the UI image components in the static UI image. This operational user interface emulates the look and feel of the static visual representation of the static UI image, but however, comprises functional UI component objects. In order to transform the operational user interface into a ready-to-use, actionable interface, the control moves to the actionable UI component construction module 250, as will be described below with respect to FIG. 7. Moreover, the entirety of the operational user interface construction is performed in a technology-agnostic manner. This provides an unique and additional improvement to technology because, the operational user interface constructed in accordance with process flows 500-600 is technology-agnostic and can be easily portable to any operational system framework with minima time and processing resources, without laborious modification of the operational user interface and the UI component object therein.

FIG. 7, illustrates a high level process flow 700 for actionable user interface component and operational user interface construction, in accordance with one embodiment of the present invention, typically performed via the actionable UI component construction module 250. As illustrated by block 705, the system is configured to process the operational user interface to transform the operational user interface based on predetermined visual parameters. Here, the transformation application 252 typically transforms the operational user interface to a predetermined enhanced structure (e.g., a structure of a size 265×256 pixels across 3 channels (e.g., red, green and blue), i.e., 265×256×3) such that the enhanced operational user interface comprises added detail and/or is compatible for clear display in the intended medium (e.g., smartphone, laptop, smart TV, etc.).

Next, the system typically determines an operating system framework associated with the static UI image, i.e., the UI desired to be constructed, at block 710. The operating system framework may comprise a type of operating system (e.g., iOS, Android, or another mobile operating system, Microsoft Windows, Mac OS, or another graphical operating system, etc.), a type of programming language (e.g., Java, etc.), and/or a type of software framework (e.g., .NET Framework, etc.). In some embodiments, the system may determine the operating system framework based on analyzing the static UI image, based on the type, names, content, shape, arrangement, etc. of UI image component therein. In some embodiments, the system may receive a user input indicating the operating system framework.

Subsequently, at block 715, the system, at the UI encoder 254, is configured to generate functional source code for each UI component object of the operational user interface based on at least the operating system framework. The functional source code is generated such that the code renders/transforms/provides functionality (e.g., makes them active or ready to use) to the UI component object. Here, the system may determine at least one action/function to be performed by the UI component object. For example, for a UI component object of a radio button, the system may determine an action of receiving a user input in the form of a click/touch/tap within a predetermined portion of the radio button and another action of transmitting a signal to another predetermined module/hardware indicating the input. As another example, for a UI component object of a submit button, the system may determine an action of receiving a user input in the form of a click/touch/tap within a predetermined portion of the submit button and an action of triggering display a pop-up window thereafter in response to the user input. The UI encoder 254 then generates the functional source code that can implement/execute the identified at least one action.

Next, the system, at the image technology mapping application 256, is configured to map the functional source code with an associated UI component object, for each UI component object of the operational user interface, thereby constructing actionable UI component objects in the operational user interface, as indicated by block 720. These actionable UI component objects can now perform/implement/execute the identified at least one action. This transforms/renders the operational user interfaces and the UI component objects therein to be dynamic, actionable and ready-to-use. In some embodiments, the image technology mapping application 256 may also map data sources with the corresponding actionable UI component objects. This underscores the technology agnostic nature of the unique UI construction of the present invention because, a significant majority of the operational user interface construction is performed in a technology agnostic manner and the operating system framework specific code is mapped only at the final stage/steps.

Finally, as indicated by block 725, the system, via the user interface package 258, is configured to transmit the operational user interface having the one or more actionable UI component objects. In this regard, the system may initiate presentation of the construction operational user interface on a display of a user device.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

| U.S. patent Application Ser. No. | Title | Filed On |
|---|---|---|
| 16/210,829 | SYSTEM FOR TRANSFORMING USING INTERFACE IMAGE SEGMENTS AND CONSTRUCTING USER INTERFACE OBJECTS | Concurrently herewith |

The invention claimed is:

1. A system for user interface construction based on image segmentation, transformation of user interface image segments, and construction of user interface objects, wherein the system is configured for user interface construction based on dynamic and operative communication between a generative network and a discriminative network, the system comprising:
   at least one memory device with computer-readable program code stored thereon;
   at least one communication device;
   at least one processing device operatively coupled to the at least one memory device and the at least one communication device, wherein executing the computer-readable code is configured to cause the at least one processing device to:
      capture a static image of a visual representation of an user interface (UI), wherein the static UI image comprises a visual representation of one or more UI image components of the UI;

analyze the static image to identify the one or more UI image components in the static UI image based on processing the static UI image, wherein identifying the one or more UI image components further comprises:

determining one or more dimensional boundaries associated with the one or more UI image components;

segment the static UI image into one or more UI image segments based on at least the one or more dimensional boundaries, wherein each UI image segment is associated with a UI image component of the one or more UI image components;

determine, for each of the one or more UI image segments, structural elements comprising a UI image component type, a UI image component spatial location, and a UI image component hierarchy level;

construct at a generative network, for a first UI image segment of the one or more UI image segments, an associated first UI component object;

generate a first convolution associated with the constructed first UI component object;

transmit the first convolution to a discriminative network comprising at least a discriminator;

perform, via the discriminator, validation of the constructed first UI component object by analyzing the first convolution, wherein validating the constructed first UI component object comprises determining an accuracy of the constructed first UI component object based on analyzing the first convolution with respect to the structural elements associated with the first UI image segment;

transmit, from the discriminative network to the generative network, a signal indicating successful or unsuccessful validation of the constructed first UI component object; and construct an operational user interface by embedding the constructed first UI component object into the operational user interface based on at least the associated (i) UI image component hierarchy level and (ii) UI image component spatial location.

2. The system of claim 1, wherein the visual representation of the UI comprises a hand drawn image and/or a wireframe associated with the UI.

3. The system of claim 1, wherein executing the computer-readable code is configured to further cause the at least one processing device to:

reshape the one or more UI image segments at the generative network to correct the one or more UI image segments; and construct a fully connected UI layer associated with the one or more UI image segments.

4. The system of claim 1, wherein constructing, at the generative network, the first UI component object for the first UI image segment further comprises:

extracting predetermined critical features from the first UI image segment, and constructing a functional UI component object that matches the structural elements associated with the first UI image segment and the extracted predetermined critical features.

5. The system of claim 1, wherein executing the computer-readable code is configured to further cause the at least one processing device to:

in response to a successful validation of the constructed first UI component object by the discriminator, perform an upsampling transformation of the first UI component object, based on at least the associated UI image component hierarchy level to render the UI component object compatible for embedding into a UI interface layer at the UI image component hierarchy level; and construct the operational user interface by embedding the transformed first UI component object into the operational user interface, wherein the transformed first UI component object is compatible for embedding into the UI interface layer of the operational user interface at (i) the UI image component hierarchy level and (ii) the UI image component spatial location.

6. The system of claim 5, wherein executing the computer-readable code is configured to further cause the at least one processing device to perform the upsampling transformation of the first UI component object in response to determine that the constructed first UI component object is not compatible for embedding into the operational user interface at (i) the UI image component hierarchy level and/or (ii) the UI image component spatial location.

7. The system of claim 1, wherein executing the computer-readable code is configured to further cause the at least one processing device to:

in response to an unsuccessful validation of the constructed first UI component object by the discriminator, determine a residual of the constructed first UI component object at the generative network; and reconstruct for the first UI image segment of the one or more UI image segments, a second UI component object based on the residual.

8. The system of claim 1, wherein executing the computer-readable code is configured to further cause the at least one processing device to:

determine an operating system framework associated with the operational user interface;

generate, at a UI encoder, functional source code for each UI component object of the operational user interface based on at least (i) at least one action to be performed by the UI component object, and (ii) the operating system framework;

map the functional source code with an associated UI component object, for each UI component object of the operational user interface, thereby constructing one or more actionable UI component objects in the operational user interface; and transmit the operational user interface having the one or more actionable UI component objects.

9. The system of claim 1, wherein the generative network further comprises an attentional generative network comprising:

a plurality of attentive component building applications, wherein each of the plurality of attentive component building applications is associated with a UI image component hierarchy level of a plurality of UI image component hierarchy levels of the static image, wherein each of the plurality of attentive component building applications is structured to construct one or more UI component object of an associated UI image component hierarchy level;

a plurality of UI component generation applications, wherein each of the plurality of UI component generation applications is structured to transform a UI component object constructed by an associated attentive component building application of the plurality of attentive component building applications; and a plurality of convolution applications, wherein each of the plurality of convolution applications is structured to perform a convolution transformation of a transformed UI component object from an associated UI component generation application of the plurality of UI component generation applications.

10. The system of claim 1 further comprises one or more image segmentation applications structured to segment the static UI image into one or more UI image segments, wherein the one or more image segmentation applications are associated with a Mask Regional Convolutional Neural Network (Mask RCNN).

11. A computer program product for user interface construction based on image segmentation, transformation of user interface image segments, and construction of user interface objects, wherein the computer program product is configured for user interface construction based on dynamic and operative communication between a generative network and a discriminative network, the computer program product comprising a non-transitory computer-readable storage medium having computer-executable instructions to:

capture a static image of a visual representation of an user interface (UI), wherein the static UI image comprises a visual representation of one or more UI image components of the UI;

analyze the static image to identify the one or more UI image components in the static UI image based on processing the static UI image, wherein identifying the one or more UI image components further comprises: determining one or more dimensional boundaries associated with the one or more UI image components;

segment the static UI image into one or more UI image segments based on at least the one or more dimensional boundaries, wherein each UI image segment is associated with a UI image component of the one or more UI image components;

determine, for each of the one or more UI image segments, structural elements comprising a UI image component type, a UI image component spatial location, and a UI image component hierarchy level;

construct at a generative network, for a first UI image segment of the one or more UI image segments, an associated first UI component object;

generate a first convolution associated with the constructed first UI component object;

transmit the first convolution to a discriminative network comprising at least a discriminator;

perform, via the discriminator, validation of the constructed first UI component object by analyzing the first convolution, wherein validating the constructed first UI component object comprises determining an accuracy of the constructed first UI component object based on analyzing the first convolution with respect to the structural elements associated with the first UI image segment;

transmit, from the discriminative network to the generative network, a signal indicating successful or unsuccessful validation of the constructed first UI component object; and construct an operational user interface by embedding the constructed first UI component object into the operational user interface based on at least the associated (i) UI image component hierarchy level and (ii) UI image component spatial location.

12. The computer program product of claim 11, wherein the visual representation of the UI comprises a hand drawn image and/or a wireframe associated with the UI.

13. The computer program product of claim 11, wherein the non-transitory computer-readable storage medium further comprises computer-executable instructions to:

determine an operating system framework associated with the operational user interface;

generate, at a UI encoder, functional source code for each UI component object of the operational user interface based on at least (i) at least one action to be performed by the UI component object, and (ii) the operating system framework;

map the functional source code with an associated UI component object, for each UI component object of the operational user interface, thereby constructing one or more actionable UI component objects in the operational user interface; and transmit the operational user interface having the one or more actionable UI component objects.

14. The computer program product of claim 11, wherein the non-transitory computer-readable storage medium further comprises computer-executable instructions to:

in response to a successful validation of the constructed first UI component object by the discriminator, perform an upsampling transformation of the first UI component object, based on at least the associated UI image component hierarchy level to render the UI component object compatible for embedding into a UI interface layer at the UI image component hierarchy level; and construct the operational user interface by embedding the transformed first UI component object into the operational user interface, wherein the transformed first UI component object is compatible for embedding into the UI interface layer of the operational user interface at (i) the UI image component hierarchy level and (ii) the UI image component spatial location.

15. A method for user interface construction based on image segmentation, transformation of user interface image segments, and construction of user interface objects, wherein the method is configured for user interface construction based on dynamic and operative communication between a generative network and a discriminative network, the method comprising:

capturing a static image of a visual representation of an user interface (UI), wherein the static UI image comprises a visual representation of one or more UI image components of the UI;

analyzing the static image to identify the one or more UI image components in the static UI image based on processing the static UI image, wherein identifying the one or more UI image components further comprises: determining one or more dimensional boundaries associated with the one or more UI image components;

segmenting the static UI image into one or more UI image segments based on at least the one or more dimensional boundaries, wherein each UI image segment is associated with a UI image component of the one or more UI image components;

determining, for each of the one or more UI image segments, structural elements comprising a UI image component type, a UI image component spatial location, and a UI image component hierarchy level;

constructing at a generative network, for a first UI image segment of the one or more UI image segments, an associated first UI component object;

generating a first convolution associated with the constructed first UI component object;

transmitting the first convolution to a discriminative network comprising at least a discriminator;

performing, via the discriminator, validation of the constructed first UI component object by analyzing the first convolution, wherein validating the constructed first UI component object comprises determining an accuracy of the constructed first UI component object based on analyzing the first convolution with respect to the structural elements associated with the first UI image segment;

transmitting, from the discriminative network to the generative network, a signal indicating successful or unsuccessful validation of the constructed first UI component object; and constructing an operational user interface by embedding the constructed first UI component object into the operational user interface based on at least the associated (i) UI image component hierarchy level and (ii) UI image component spatial location.

16. The method of claim 15, wherein the visual representation of the UI comprises a hand drawn image and/or a wireframe associated with the UI.

17. The method of claim 15, wherein the method further comprises:

determining an operating system framework associated with the operational user interface;

generating, at a UI encoder, functional source code for each UI component object of the operational user interface based on at least (i) at least one action to be performed by the UI component object, and (ii) the operating system framework;

mapping the functional source code with an associated UI component object, for each UI component object of the operational user interface, thereby constructing one or more actionable UI component objects in the operational user interface; and transmitting the operational user interface having the one or more actionable UI component objects.

18. The computer program product of claim 11, wherein the non-transitory computer-readable storage medium further comprises computer-executable instructions to:

in response to an unsuccessful validation of the constructed first UI component object by the discriminator, determine a residual of the constructed first UI component object at the generative network; and reconstruct for the first UI image segment of the one or more UI image segments, a second UI component object based on the residual.

19. The method of claim 15, wherein the method further comprises:

in response to a successful validation of the constructed first UI component object by the discriminator, performing an upsampling transformation of the first UI component object, based on at least the associated UI image component hierarchy level to render the UI component object compatible for embedding into a UI interface layer at the UI image component hierarchy level; and constructing the operational user interface by embedding the transformed first UI component object into the operational user interface, wherein the transformed first UI component object is compatible for embedding into the UI interface layer of the operational user interface at (i) the UI image component hierarchy level and (ii) the UI image component spatial location.

20. The method of claim 15, wherein the method further comprises:

in response to an unsuccessful validation of the constructed first UI component object by the discriminator, determining a residual of the constructed first UI component object at the generative network; and reconstructing for the first UI image segment of the one or more UI image segments, a second UI component object based on the residual.

\* \* \* \* \*